(12) United States Patent
Yang et al.

(10) Patent No.: US 8,599,821 B2
(45) Date of Patent: Dec. 3, 2013

(54) METHOD, TERMINAL AND NETWORK DEVICE FOR CHANGING STATUS OF A PACKET SWITCHED DOMAIN

(75) Inventors: Jian Yang, Shenzhen (CN); Lei Wang, Shenzhen (CN); Guoqiao Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 832 days.

(21) Appl. No.: 12/407,222

(22) Filed: Mar. 19, 2009

(65) Prior Publication Data

US 2009/0180463 A1    Jul. 16, 2009

Related U.S. Application Data

(63) Continuation of application No. PCT/CN2008/070379, filed on Feb. 29, 2008.

(30) Foreign Application Priority Data

Mar. 31, 2007   (CN) .......................... 2007 1 0073939
Jun. 12, 2007   (CN) .......................... 2007 1 0110853

(51) Int. Cl.
     *H04J 3/24*    (2006.01)
(52) U.S. Cl.
     USPC ........................................................ 370/349
(58) Field of Classification Search
     None
     See application file for complete search history.

(56) References Cited

U.S. PATENT DOCUMENTS

| | | | |
|---|---|---|---|
| 5,903,557 A | | 5/1999 | Johansson et al. |
| 6,041,109 A | * | 3/2000 | Cardy et al. .............. 379/201.01 |
| 6,697,604 B1 | | 2/2004 | Rimpelä et al. |
| 6,987,779 B1 | | 1/2006 | Sevanto et al. |
| 7,123,920 B1 | | 10/2006 | Faccin et al. |
| 7,907,541 B2 | * | 3/2011 | Lindstrom et al. ............. 370/252 |
| 2005/0135348 A1 | * | 6/2005 | Staack .......................... 370/353 |
| 2005/0202819 A1 | | 9/2005 | Blicker |
| 2006/0036741 A1 | * | 2/2006 | Kiss et al. ...................... 709/227 |

(Continued)

FOREIGN PATENT DOCUMENTS

| | | |
|---|---|---|
| CN | 1239619 A | 12/1999 |
| CN | 1568050 A | 1/2005 |

(Continued)

OTHER PUBLICATIONS $1^{st}$ Office Action in corresponding Korean Application No. 2009-7012209 (Jan. 11, 2011).

(Continued)

*Primary Examiner* — Chi Pham
*Assistant Examiner* — Kouroush Mohebbi
(74) *Attorney, Agent, or Firm* — Leydig, Voit & Mayer, Ltd.

(57) ABSTRACT

The present invention provides a method, terminal and network device for changing the status of a packet switched domain. The method includes (1) receiving an instruction, for changing the status of a packet switched domain, sent from a first terminal, wherein the changing of the status of the packet switched domain includes activating the packet switched domain or modifying a parameter of the packet switched domain where a second terminal is currently located and (2) changing the status of the packet switched domain according to the instruction. In various embodiments of the present invention, the terminal can activate the PS domain passively to deploy PS domain based services.

12 Claims, 6 Drawing Sheets

(56) References Cited

U.S. PATENT DOCUMENTS

| | | | |
|---|---|---|---|
| 2006/0182092 A1 | 8/2006 | Kodaka | |
| 2007/0242659 A1* | 10/2007 | Cantu et al. | 370/352 |
| 2008/0090570 A1* | 4/2008 | Deshpande et al. | 455/436 |
| 2010/0046499 A1* | 2/2010 | Hu et al. | 370/352 |

FOREIGN PATENT DOCUMENTS

| | | |
|---|---|---|
| CN | 1638499 A | 7/2005 |
| CN | 1767482 A | 5/2006 |
| CN | 1820461 A | 8/2006 |
| EP | 0929956 A1 | 7/1999 |
| EP | 1311104 A2 | 5/2003 |
| EP | 1 273 134 B1 | 11/2004 |
| EP | 1742439 A1 | 1/2007 |
| JP | 11-225162 A | 8/1999 |
| JP | 2000125040 A | 4/2000 |
| JP | 2000196738 A | 7/2000 |
| JP | 2002165022 A | 6/2002 |
| JP | 2004048216 A | 2/2004 |
| JP | 2005229526 A | 8/2005 |
| JP | 2005311702 A | 11/2005 |
| JP | 2006253898 A | 9/2006 |
| JP | 2006254411 A | 9/2006 |
| JP | 2006262268 A | 9/2006 |
| JP | 2007020000 | 1/2007 |
| WO | WO 98/15089 A1 | 4/1998 |
| WO | WO 2007/024169 A1 | 3/2007 |

OTHER PUBLICATIONS

Ozugur, "Supporting Dynamic IP Addresses for Wireless Push Services in Cellular Networks," *IEEE*, 184-188 (Oct. 29, 2002).
$2^{nd}$ Office Action in corresponding Chinese Application No. 200710110853.0 (Apr. 2, 2011).
English Translation of the PCT Written Opinion from the International Searching Authority in corresponding PCT Application No. PCT/CN2008/070379 (Jun. 5, 2008).
$1^{st}$ Chinese Office Action from the Chinese Patent Office in corresponding Chinese Patent Application No. 200710110853.0 (Jun. 23, 2010).
"3GPP TS 24.279— Combining Circuit Switched (CS) and IP Multimedia Subsystem (IMS) services; Stage 3 (Release 7)," Mar. 2007, V7.4.0, $3^{rd}$ Generation Partnership Project, Valbonne, France.
Office Action in corresponding Japanese Application No. 2009-543338 (Jan. 10, 2010).
Extended European Search Report in corresponding European Patent Application No. 12155340.8 (Apr. 26, 2012).
$2^{nd}$ Office Action in corresponding Japanese Patent Application No. 2009-543338 (Oct. 30, 2012).

\* cited by examiner

US 8,599,821 B2

METHOD, TERMINAL AND NETWORK DEVICE FOR CHANGING STATUS OF A PACKET SWITCHED DOMAIN

CROSS-REFERENCE TO RELATED APPLICATIONS

This application is a continuation of International Patent Application No. PCT/CN2008/070379, filed Feb. 29, 2008, which claims priority to Chinese Patent Application No. 200710073939.0, filed Mar. 31, 2007 and Chinese Patent Application No. 200710110853.0, filed Jun. 12, 2007, all of which are hereby incorporated by reference in their entirety.

FIELD OF THE INVENTION

The present invention relates to the mobile communication field, and in particular to a method, terminal and network device for changing the status of a packet switched (PS) domain.

BACKGROUND OF THE INVENTION

With the development of mobile communication technologies, more and more attention has been paid to the IP Multimedia Subsystem (IMS). The IMS is a multimedia control/call control platform over a PS domain, which supports session type and non-session type multimedia services, and provides a general service enabling platform for future multimedia applications. The IMS uses the PS domain to bear and transmit multimedia signals and can be regarded as being superposed over the PS domain which serves the IMS.

Based upon the IMS, the provider can deploy numerous services, such as stream media service, visual telephone service, Push to Talk over Cellular (PoC) service, presence service, Instant Messenger (IM) service, and Combined Circuit Switched and IP Multimedia Subsystem Sessions (CSI) service.

For all PS domain based services, including the IMS service, the current application protocols require that all participating terminals shall have activated a PS domain during deployment of service. On this premise, any service initiator may first activate the PS domain on its own initiative when initiating service, but it cannot ensure whether the opposite terminal has activated the PS domain. Also in the case that the terminal of the service initiator (the terminal may activate the PS domain on its own initiative after deciding to initiate the service) has activated the PS domain but the opposite terminal has not activated the PS domain, the service cannot be transmitted based upon the PS domain, and the PS domain based services, including the IMS service, cannot be implemented.

In order to ensure smooth deployment of the PS domain based service, existing systems utilize a terminal to activate a PS domain on its own initiative each time it is powered on so as to register with an IMS domain. Therefore, the terminal supporting the PS domain based service in a communication system can be kept at any time in the status of PS domain being activated. These systems can ensure smooth deployment of the PS domain based service.

However, the inventors of the present invention have found that at least the following drawbacks exist in the existing systems which are not practical in many applications. For example, in practical applications, not all terminals are expected to activate a PS domain when they are powered on. Consequently, existing systems may have negative influences on users' experience.

SUMMARY OF THE INVENTION

Embodiments of the present invention provide a method for changing the status of a packet switched domain, so that a terminal can change the status of the PS domain passively, and so as to deploy PS domain based services in the PS domain whose status has been changed.

Embodiments of the present invention further provide a terminal which supports passively changing the status of a PS domain to deploy PS domain based services in the PS domain whose status has been changed.

Embodiments of the present invention further provide a service activation center for instructing a terminal to change the status of a PS domain to deploy PS domain based services in the PS domain whose status has been changed.

Embodiments of the present invention further provides a mobile switching center for instructing a terminal to change the status of a PS domain to deploy PS domain based services in the PS domain whose status has been changed.

A method for changing the status of a packet switched domain according to embodiments of the present invention includes (1) receiving an instruction for changing a status of a packet switched domain sent from a first terminal, wherein the changing of the status of the packet switched domain includes activating the packet switched domain or modifying a parameter of the packet switched domain where a second terminal is currently located; and (2) changing the status of the packet switched domain according to the instruction.

A terminal according to embodiments of the present invention includes (1) a receiving unit, adapted to receive an instruction for changing a status of a packet switched domain sent from a first terminal, wherein the changing of the status of the packet switched domain includes activating the packet switched domain or modifying a parameter of the packet switched domain where the terminal is currently located; and (2) a packet switched domain processing unit, adapted to change the status of the packet switched domain of the terminal according to the instruction for changing the status of the packet switched domain.

A service activation center according to embodiments of the present invention includes (1) an activation instruction receiving unit, adapted to receive an instruction, for activating a packet switched domain, from a first terminal; and (2) an activation instruction forwarding unit, adapted to forward the instruction, for activating the packet switched domain, to a second terminal.

A mobile switching center according to embodiments of the present invention includes (1) an activation instruction receiving unit, adapted to receive a dual tone multi-frequency message from a first terminal; (2) a parsing unit, adapted to parse the dual tone multi-frequency message received by the activation instruction receiving unit; (3) an encapsulating unit, adapted to encapsulate information in the dual tone multi-frequency message as a signaling message when the parsing unit determines from the parsing that the dual tone multi-frequency message is used to instruct a second terminal to activate a packet switched domain; and (4) a sending unit, adapted to send the signaling message resulting from the encapsulation at the encapsulation unit to the second terminal.

As can be seen from the above technical solutions, with the technical solutions according to embodiments of the present invention, the second terminal receives the instruction, for changing the status of the PS domain, sent from the first terminal. After receiving the instruction, the second terminal can change the status of the PS domain passively according to the instruction, so that the second terminal and the first terminal can deploy PS domain based services, such as IMS services, in the PS domain whose status has been changed. Obviously, with the technical solutions according to embodiments of the present invention, the requested party of a service can change the status of the PS domain passively, so that it is possible for the first terminal and the second terminal to deploy PS domain based services, such as IMS services, in the PS domain whose status has been changed.

Particularly, when changing the status of the packet switched domain is activating the PS domain, the second terminal can activate the PS domain according to the instruction, so that the requested party of a service can activate the PS domain passively in the case that the requested party has not activated the PS domain. In this way, it is possible for the two service parties supporting the PS service to deploy PS domain based services (such as IMS services) as required. Obviously, with the technical solutions according to embodiments of the present invention, the terminal can activate the PS domain passively as required by services, so that the terminal can deploy the PS domain based service, which is different from the existing systems in which the user is required compulsively to activate the PS domain of the terminal on his own initiative when the terminal is being powered on. Therefore, the technical solutions according to embodiments of the present invention, compared with those in the existing systems, achieve that the terminal can change the status of the PS domain passively to deploy PS domain based services in the PS domain whose status has been changed, which can improve the experience of terminal users. Thus, the technical solutions according to embodiments of the present invention are more feasible.

BRIEF DESCRIPTION OF THE DRAWINGS

The drawings presented here are provided to facilitate further understanding of the present invention and constitute part of this application but are not intended to limit the present invention.

DETAILED DESCRIPTION OF THE INVENTION

The present invention will be described in details hereinafter with reference to the drawings and the embodiments. The exemplary embodiments of the present invention and the descriptions thereof are merely illustrative but not limitative of the present invention.

According to the first embodiment below, a method for changing the status of a PS domain is described for the case where a first terminal instructs a second terminal (regardless of whether it is in a PS domain, in a CS domain or in other communication status) to activate a certain PS domain.

According to the second, third, fourth, fifth and sixth embodiments, methods are described, where a first terminal instructs a second terminal which is not in any PS domain to activate a certain PS domain.

In the seventh embodiment, a method for changing the status of a PS domain is described, where a first terminal instructs a second terminal in the same PS domain to change a parameter of the current PS domain.

In the eighth embodiment, a method for changing the status of a PS domain is described, where a first terminal instructs a second terminal in the same PS domain (be referred to as a first PS domain hereinafter) to activate a PS domain where the second terminal is absent.

In the ninth embodiment, a terminal supporting a method for changing the status of a PS domain is described.

In the tenth embodiment, a service activation center supporting a method for changing the status of a PS domain is described.

In the eleventh embodiment, a mobile switching center supporting a method for changing a status of a PS domain is described.

The First Embodiment

Figure 1:
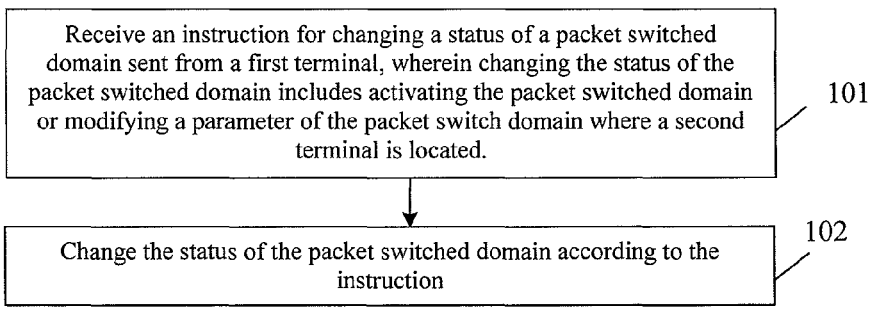
FIG. 1 is a schematic diagram illustrating a method for activating a PS domain according to a first embodiment of the present invention.

FIG. 1 is a schematic diagram illustrating the flow of a method for activating a PS domain according to the first embodiment. As illustrated in FIG. 1, the method includes the following steps.

Block 101: An instruction for changing the status of a packet switched domain sent from a first terminal is received, where changing the status of the packet switched domain includes activating the packet switched domain or modifying a parameter of the packet switched domain where a second terminal is currently located.

Block 102: The status of the packet switched domain is changed according to the instruction.

This embodiment takes it as an example that the second terminal receives via a communication network the instruction for changing the status of the packet switched domain sent from the first terminal, but will not be limited to this example. A specific implementation of this example can be as follows.

Firstly, the first terminal sends via a communication network an instruction, instructing the second terminal to activate a PS domain.

When the first terminal requires an application of the PS domain (deployment of IMS service is a typical application of the PS domain), it can activate the PS domain on its own initiative with reference to the solution in the conventional art. After activating the PS domain, the first terminal sends a message to the communication network, instructing the opposite second terminal of the service to be implemented to perform an operation of activating the PS domain.

Here, the message sent from the first terminal to the second terminal for instructing activation of the PS domain can include but not be limited to a Dual Tone Multi-Frequency (DTMF) message, a short message, a call Setup message, a Push message, an Unstructured Supplementary Service Data (USSD) message, a session Invite request message, etc.

Particularly, if the first terminal and the second terminal are currently in the same PS domain, the sending from the first terminal of an instruction to the communication network to instruct the second terminal to activate the PS domain in this embodiment includes instructing the second terminal to activate a second PS domain inactivated.

Thereafter, the communication network delivers the instruction to the second terminal.

After receiving the instruction for instructing the second terminal to activate the PS domain sent from the first terminal, the communication network sends the instruction to the second terminal.

For example, when the first terminal and the second terminal belong to the same mobile switching center, this mobile switching center forwards the instruction.

When the first terminal and the second terminal belong to different mobile switching centers, the mobile switching center to which the first terminal belongs, after receiving the instruction, delivers the instruction to the mobile switching center to which the second terminal belongs, and then the latter mobile switching center sends the instruction to the second terminal within the coverage area.

Finally, the second terminal receives the instruction and activates the PS domain according to the instruction.

After receiving the instruction, the second terminal knows that the first terminal currently requests the second terminal to activate the PS domain, so that the second terminal can implement PS domain based services (for example, the services can include but not be limited to IMS services) with the first terminal. The second terminal can initiate activation of the PS domain, after receiving the instruction, so as to implement the PS domain based services with the first terminal.

Additionally, in order to optimize activation of the PS domain by the second terminal, and avoid unnecessary processing of a network where the second terminal is located and the terminals brought up by the operation of activating the PS domain performed by the second terminal in the case that the second terminal or the network does not support activation of the PS domain, the second terminal can, after receiving the activation instruction, determine whether the present terminal supports the PS domain service (i.e., whether to support activation of the PS domain) and whether the network where the present terminal is located allows use of the PS service (i.e., whether to support activation of the PS domain). The operation of activating the PS domain can be performed only if the present terminal supports the PS domain service and the network where the present terminal is located allows use of the PS service.

Alternatively, in the case that a user of the terminal can decide whether to agree on acceptance of the PS domain activation request, it is further determined whether the present terminal agrees on acceptance of the PS domain activation request. The operation of activating the PS domain can be performed only if the present terminal supports the PS domain service, the network where the present terminal is located allows use of the PS services, and the present terminal agrees on acceptance of the PS domain activation request.

As can be seen from above, with the method according to this embodiment of the present invention, the second terminal can activate the PS domain passively according to the instruction from the initiator of the PS domain service to implement the corresponding PS services. Thus, the requested party of the PS domain based services (e.g., IMS services) which currently has not activated the PS domain can activate the PS domain passively, so that it is possible for the first terminal and the second terminal to deploy the PS domain based services (e.g., IMS services).

A method according to the embodiment of the present invention will be described in details below, taking it as an example that a first terminal instructs a second terminal to activate a PS domain and IMS service is deployed after the PS domain is activated.

Figure 2:
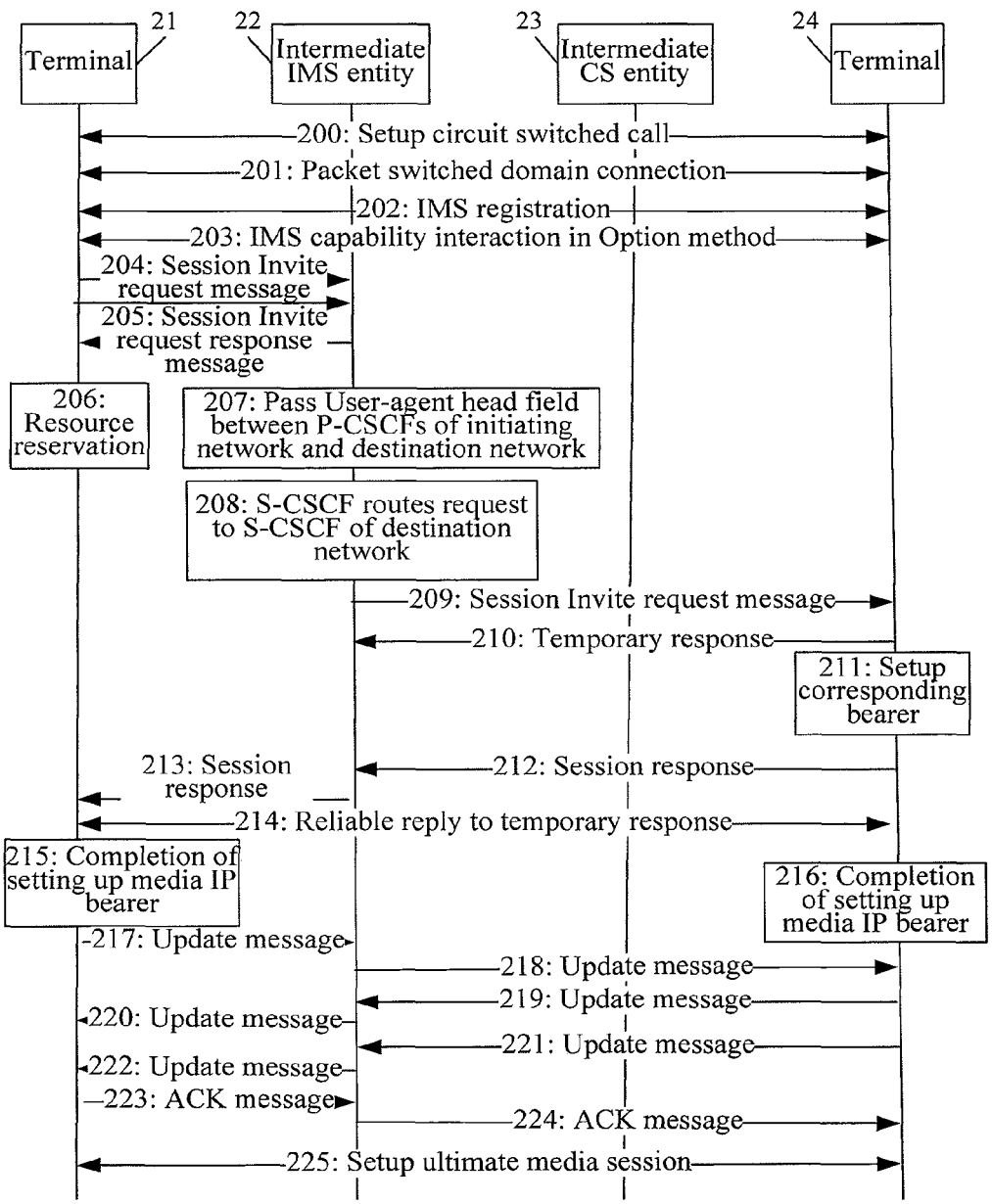
FIG. 2 is a schematic diagram illustrating a signaling flow in which a first terminal initiates IMS services to a second terminal according to the first embodiment of the present invention.

FIG. 2 is a schematic diagram illustrating a signaling flow in which a first terminal initiates IMS services to a second terminal which has not activated a PS domain. As illustrated in FIG. 2, the flow is as follows.

200: A Circuit Switched (CS) call is set up between a terminal 21 and a terminal 24 via a CS domain network.

201: A process of PS domain connection. The process includes: after deciding to initiate CSI service, the terminal 21 sets up connection with a PS domain on its own initiative, activating the PS domain; the terminal 21 sends via the network to the terminal 24 a message for instructing the terminal 24 to activate the PS domain; and after receiving the message, the terminal 24 sets up connection with the PS domain, activating the PS domain. Reference can be made to the existing systems for details of the processes in which the each terminal sets up connection with the PS domain and activates the PS domain.

202: A process of IMS domain registration. After the PS domain is activated, the terminal 21 and the terminal 24 log on and register with the PS domain based IMS domain, respectively.

203: The terminal 21 and the terminal 24 interact with each other for IMS capabilities using an OPTION method. The interaction primarily involves the association relationship between the Mobile Station International Integrated Services Digital Network Number (MSISDN) and the Uniform Resource Identifier (URI) of the Session Initiation Protocol (SIP) of the terminals as well as terminal capability information.

Particularly, the terminal capability information is used to determine a set of services that can be invoked successfully when an IMS session is set up between two terminals. The IMS capability information can include but not be limited to the following information (1) the type of IMS media (e.g., the definition of media components in the IMS session); (2) parameters of the media format (the codec format, the media file format, etc.) supported by the IMS media type; and (3) the association relationship between the MSISDN and the SIP URI of the terminal transmitting the terminal capability information.

Additionally, the terminals can also make interaction of the following capability information via an IMS network:
capability of a video telephone in a circuit domain;
capability of an audio telephone in a circuit domain;
capability of multimedia message; and
capabilities of other IMS based services, e.g., PoC.

204: The terminal 21 sends to the terminal 24 via the IMS network a session INVITE request message, requesting for setting up an IMS session in accordance with the result of the capability interaction.

205: A Proxy-Call Session Control Function (P-CSCF) in an intermediate IMS entity 22 responds to the request message initiated from the terminal with a session INVITE request response (e.g., responds with a 100 Trying message as specified in the protocol).

206: The terminal 21 reserves a resource in accordance with contents of the Session Description Protocol (SDP).

207: A User-Agent head field is passed between the P-CSCFs (the intermediate IMS entities 22) of the initiating network and the destination network.

208: A serving-Call Session Control Function (S-CSCF) (the intermediate IMS entity 22) of the initiating network replaces the call uniform resource identifier (Tel URI) in the request message with the SIP-URI and then routes the INVITE request to the S-CSCF in the destination network.

209: The P-CSCF of the destination network forwards the session INVITE request message to the terminal 24.

210: The terminal 24 sends a temporary response (possibly a 100 Trying message) to the P-CSCF of the destination network.

211: The terminal 24 sets up a corresponding bearer in accordance with the received SDP contents.

212: The terminal 24 responds to the session returned from the core network (the intermediate IMS entity 22) (possibly 183 Session Progress), and is required to state supporting CS voice and CS video capabilities in a Contact head field, and to contain a personal mobile terminal identifier in a Server head field. The terminal 24 here supports resource reservation mechanism and preprocessing mechanism.

213: The P-CSCF of the initiating network (the intermediate IMS entity 22) returns a session response (possibly 183 Session Progress) to the terminal 21.

214: The terminal 21 replies to the terminal 24 with a reliable reply to the temporary response (e.g., PRACK).

215: The terminal 21 sets up an IP bearer of media.

216: The terminal 24 sets up an IP bearer of media.

217: The terminal 21 sends an UPDATE message to the intermediate IMS entity 22 to notify the terminal 24 that the terminal 21 can receive and transmit media contents.

218: The intermediate IMS entity 22 sends the UPDATE message to the terminal 24 and the terminal 24 starts ringing.

219: The terminal 24 returns an update response (e.g., 200 OK) for the UPDATE message, indicating that the terminal 24 is ready to receive and transmit media contents.

220: The P-CSCF of the initiating network forwards the response (e.g., 200 OK) returned from the terminal 24 for the UPDATE message to the terminal 21.

221: The terminal 24 returns a response (e.g., 200 OK) for the INVITE message of the terminal 21, indicating that the user has hooked off.

222: The P-CSCF of the initiating network forwards a response (e.g., 200 OK) carrying the hook-off information of the terminal 24 to the terminal 21.

223: The terminal 21 returns an acknowledgment message (ACK) for the hook-off information.

224: The P-CSCF of the destination network forwards the acknowledgement message (ACK) for the hook-off information to the terminal 24.

225: An ultimate media session is set up in which the terminal 21 and the terminal 24 can share, for example, video clips, video live contents, audio, pictures, files, etc., during voice communication in the way described above over the existing CS network and IMS core network.

The Second Embodiment

In this embodiment, a method for activating a PS domain according to the first embodiment of the present invention will be described in detail, taking it as an example that a first terminal is required to initiate CSI service (one of IMS services) to a second terminal and that the first terminal instructs via a DTMF message the second terminal to activate a PS domain.

Figure 3:
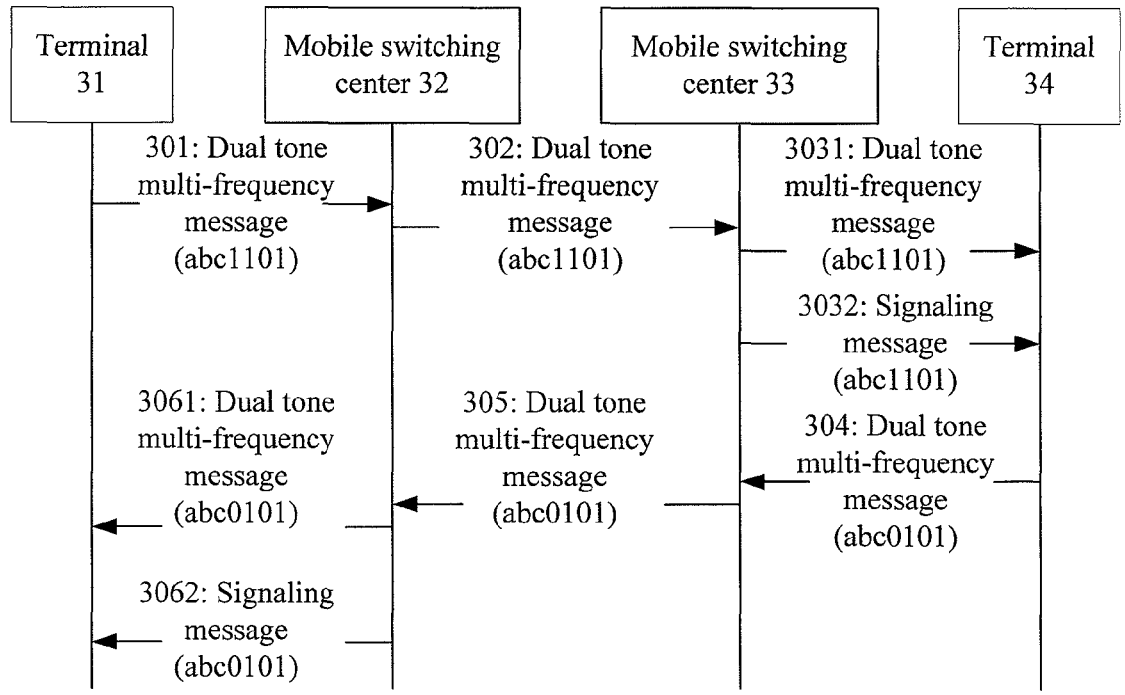
FIG. 3 is a schematic diagram illustrating a signaling flow in which a first terminal instructs via a Dual Tone Multi-Frequency (DTMF) message a second terminal to activate a PS domain according to a second embodiment of the present invention.

It is assumed that a terminal 31 and a terminal 34 are in an ongoing CS session and the terminal 31 initiates CSI service. The terminal 31 initiating the CSI service has activated a PS domain when the initiation is made. However, the terminal 34 does not reside in the PS domain, i.e., has not activated the PS domain. Therefore, the following flow is required to be performed (see FIG. 3).

301: The terminal 31 generates a DTMF message carrying information for instructing the terminal 34 to activate a PS domain, so that the terminal 34 can know from the information that a PS domain activation operation is currently required to be performed (for example, a specific bit value can be carried in the message so that in accordance with a predetermined protocol, the terminal 34 can know from the specific bit value that the PS domain activation operation is currently required to be performed). The terminal 31 sends the generated DTMF message to a mobile switching center 32 to which the terminal 31 belongs.

According to this embodiment of the present invention, a preferred structure of the information for instructing the terminal 34 to activate the PS domain is provided. The structure includes a service identifier, a message type, a stream code, and service data information.

The service identifier is adapted to indicate that a current message is a message for instructing activation of a PS domain. In this embodiment, it is specified that the service identifier occupies 3 characters. When taking a value of abc, the service identifier indicates that the current message is a message for instructing activation of the PS domain.

The message type is adapted to identify the type of the message and occupies 1 character in this embodiment. As specified, when taking a value of 1, the message type indicates that the message is a request message. When taking a value of 0, the message type indicates that the message is a response message.

The stream code identifies a stream code rate and occupies 1 character in this embodiment. The stream code can take a value ranging from 1 to 9.

A status code identifies the status of a terminal and occupies 2 characters in this embodiment. As specified, the status code indicates "Activated" when taking a value of 01, indicates that the terminal does not support activation of the PS domain when taking a value of 02, indicates that the terminal user rejects the activation operation when taking a value of 03, and indicates that the network where the terminal is located does not support activation of the PS domain when taking a value of 04. Other values can be extended for use.

The service data carries extended data and has a variable length in this embodiment.

In accordance with the information formats and protocols for the values provided above, at 301, the terminal 31 sends a DTMF message carrying an information body of "abc1101" to the mobile switching center 32.

302: The mobile switching center 32 sends the received DTMF message ("abc1101") to a mobile switching center 33 to which the terminal 34 belongs.

3031: The Mobile switching center 33 forwards the DTMF message to the terminal 34.

After receiving the DTMF message (the message carrying the information "abc1101") sent from the mobile switching center 33, the terminal 34 parses the carried information ("abc1101") from the mixing tone, knows that the current message is a message for requesting to activate the PS domain, and thereby performs a corresponding operation of activating the PS domain. The operation of activating the PS domain can be performed directly. Alternatively, it is determined whether the present terminal supports activation of the PS domain and whether the network where the present terminal is located supports activation of the PS domain. In the case that both of the determinations are affirmative, the operation of activating the PS domain is performed. Or, it is determined whether the present terminal supports activation of the PS domain, whether the network where the present terminal is located supports activation of the PS domain, and whether the present terminal agrees on activation of the PS domain. The operation of activating the PS domain is performed only if all of the determinations are affirmative.

3032 (which can take the place of 3031): The mobile switching center 33 parses the DTMF message, and knows from the carried information ("abc1101") that the DTMF message carries the PS activation request. Then, the mobile switching center 33 extracts the information ("abc1101") encapsulated in the DTMF message, re-encapsulates the information into a signaling message (it can be but is not limited to a Facility message in this embodiment), and sends the signaling message to the terminal 34.

Correspondingly, after receiving the signaling message (e.g., encapsulated in a Facility message carrying the information "abc1101") sent from the mobile switching center 33, the terminal 34 parses the carried information ("abc1101"), knows that the current message is a message for requesting to activate the PS domain, and thereby performs a corresponding operation of activating the PS domain, details of which are described above.

At 3032, the mobile switching center 33 re-encapsulates the information carried in the received DTMF message into a signaling message, such as a Facility message, instead of sending the DTMF message directly to the terminal 34, so that the terminal 34 can receive the message while avoiding any unnecessary interference with the current CS session.

For the purpose of highly reliable transmission, after receiving the service request message, the terminal 34 can proceed with the following flow of replying with an acknowledgement message.

304: The terminal 34 generates a DTMF response message (alternatively, it can also be a Facility message or the like) carrying information "abc0101" and then sends the DTMF response message to the mobile switching center 33.

305: The mobile switching center 33 forwards the received DTMF response message to the mobile switching center 32.

3061: The mobile switching center 32 forwards the DTMF response message to the terminal 31.

After receiving the DTMF response message, the terminal 31 parses the information "abc0101" of the DTMF response message from the mixing tone, and knows that the terminal 34 has received the service request properly and agreed on activation.

3061 can also be replaced with 3062.

3062: The mobile switching center 32 parses the DTMF response message, extracts the information ("abc0101") encapsulated in the DTMF message, re-encapsulates the information into a signaling message (it can be but is not limited to a Facility message), and sends the signaling message to the terminal 31.

After receiving the signaling message (for example, encapsulated in a Facility message carrying the information "abc0101"), the terminal 31 parses the information "abc0101" of the DTMF response message, and knows that the terminal 34 has received the service request properly and agreed on activation.

At 3062, the mobile switching center 32 re-encapsulates the information carried in the received DTMF response message into a signaling message, such as a Facility message, instead of sending the DTMF message directly to the terminal 31, so that the terminal 31 can receive the message while avoiding any unnecessary interference with the current CS session.

In order to prevent a loss of signaling during transmission from causing unsuccessful activation of the PS domain, it can be specified that the terminal 31 will restart the flow from 301 if the terminal 31 fails to receive information replying to the service request during a certain period of time.

Further, the response message returned from the terminal 34 can also carry additional information. For example, the request will be rejected on a certain condition (e.g., within a certain period of time). Thus, the terminal 31 will not perform more retransmission on this condition (for example, "03" indicates that the activation request is rejected, and the terminal 31 will not perform more retransmission).

As can be seen from above, with the method according to this embodiment of the present invention, the terminal 31 can send a DTMF message instructing the terminal 34 to activate the PS domain, and the terminal 34 can trigger the operation of activating the PS domain according to the instruction, so that the terminal 34 can activate the PS domain passively. Further, the terminal 31 sends via a DTMF message (the user of the terminal 31 can trigger a specific key, and the terminal 31 can generate and send a corresponding DTMF message according to the triggered key) the instruction for activating the PS domain, which is convenient to be implemented.

The Third Embodiment

In this embodiment, a method for activating a PS domain according to the first embodiment of the present invention will be described in detail, taking it as an example that a first terminal is required to initiate CSI service to a second terminal and that the first terminal instructs via a short message the second terminal to activate a PS domain.

Figure 4:
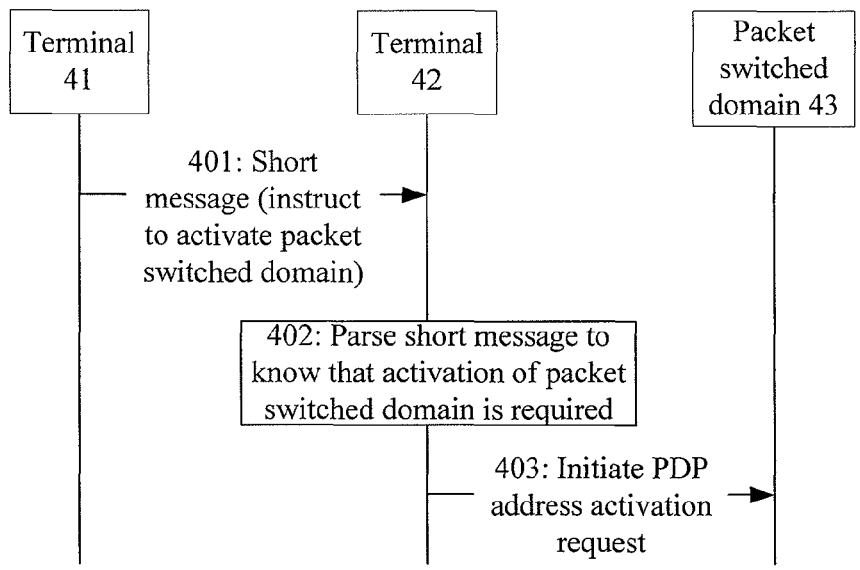
FIG. 4 is a schematic diagram illustrating a signaling flow in which a first terminal instructs via a short message a second terminal to activate a PS domain according to a third embodiment of the present invention.

It is assumed that a terminal 41 and a terminal 42 are in an ongoing CS session and the terminal 41 initiates CSI service. The terminal 41 initiating the CSI service has activated a PS domain 43 when the initiation is made. However, the terminal 42 does not reside in the PS domain 43, i.e., has not activated the PS domain 43. Therefore, the following flow is required to be performed (see FIG. 4).

401: The terminal 41 generates a Short Message (SM) carrying information for instructing the terminal 42 to activate the PS domain 43, so that the terminal 42 can know from the information that an operation of activating the PS domain 43 is currently required to be performed. The terminal 31 sends the generated short message to the terminal 42 via a short message center.

In accordance with a short message protocol, a specific identifier (e.g., a Tele-service ID, a port number, etc., which can be denominated differently as the protocol varies) can be used to identify a service carried in the short message, such as a common short message, a Push service, and a voice mail alarm. The specific identifiers of these services are assigned with different values, and the terminal can hereby distinguish them and conduct a corresponding application process on the received message. In this embodiment, with a reserved portion of values of the above specific identifier, the specific identifier can be assigned with a specific value to indicate that the short message is used to request the opposite terminal to activate the PS domain.

402: The terminal 42 parses from the short message the identifier of the service to be activated, and knows that the current short message is a protocol message for instructing activation of the PS domain. The short message is unnecessary to be shown to the user. Instead, the flow proceeds with 403.

403: The terminal 42 initiates to the packet switched domain 43 (e.g., a GGSN) a Packet Data Protocol (PDP) activation request, activating the PDP and the packet switched domain 43.

Thereafter, the terminal 42 can initiate registration with a CSCF and enter the flow of IMS service. For details of a specific flow in which the terminal initiates registration with the CSCF and enters the flow of IMS service, reference can be made to the corresponding descriptions of the flow from 202 to 205 in the first embodiment.

As can be seen from above, with the method according to this embodiment of the present invention, the terminal 41 can send a SM message instructing the terminal 42 to activate the PS domain 43, and the terminal 42 can trigger the operation of activating the PS domain 43 according to the instruction, so that the terminal 42 can activate the PS domain 43 passively. Further, the terminal 41 sends the instruction for activating the PS domain 43 via a short message applied widely and conveniently, which is convenient to be implemented.

The Fourth Embodiment

In this embodiment, a method for activating a PS domain according to the first embodiment of the present invention will be described in detail, still taking it as an example that a first terminal is required to initiate CSI service to a second terminal and that the first terminal instructs via a short message the second terminal to activate a PS domain.

Figure 5:
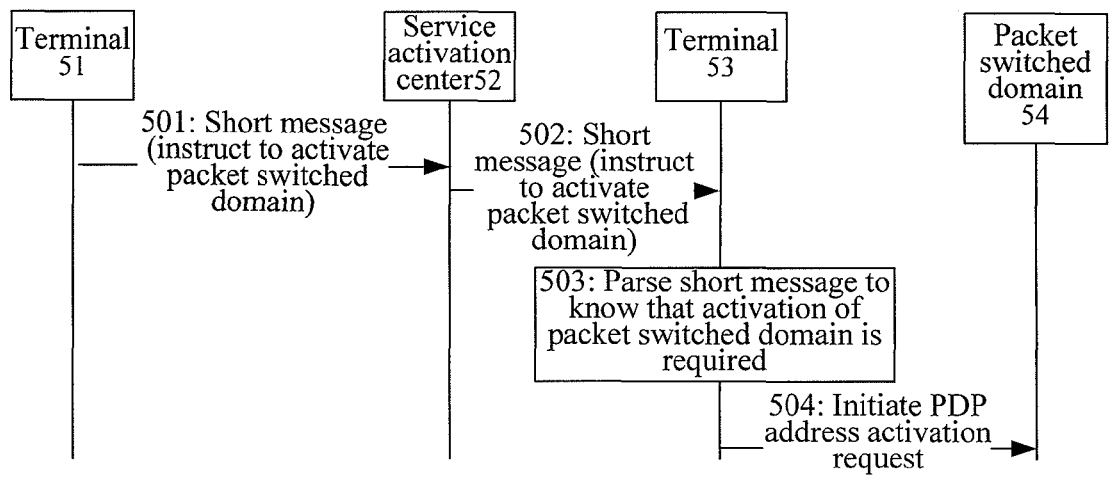
FIG. 5 is a schematic diagram illustrating a signaling flow in which a first terminal instructs via a short message a second terminal to activate a PS domain according to a fourth embodiment of the present invention.

As illustrated in FIG. 5, the method according to this embodiment is different from that according to the third embodiment in that a service activation center 52 is additionally provided in this embodiment to relay and process a short message for instructing the terminal 53 to activate a PS domain. The flow illustrated in FIG. 5 is as follows.

501: The terminal 51 generates a short message carrying information for instructing the terminal 53 to activate a PS domain 54, so that the terminal 53 can know from the information that an operation of activating the PS domain 54 is currently required to be performed. An address of the service activation center 52 is also added in the short message. Then, the terminal 51 sends the generated short message to the service activation center 52.

502: The service activation center 52 sends via a short message to the terminal 53 the information for instructing the terminal 53 to activate the PS domain 54.

503: The terminal 53 parses the short message and knows from the address in the short message, the address of the service activation center 52, that the current short message is from the service activation center 52 and is used for the service activation process. And, the terminal 53 knows from the specific information contents carried in the short message that the current short message is used to request for activating the PS domain 54. At this time, the specific message body may not be shown to the user.

504: The terminal 53 initiates to the packet switched domain 54 (e.g., a GGSN) a PDP activation request, activating the PDP and the packet switched domain 54.

Thereafter, the terminal 53 can initiate registration with a CSCF and enter the flow of IMS service.

In this embodiment, the service activation center 52 can particularly be connected with the short message center, i.e., it can be thought that the short message center regards the service activation center 52 as a value-added service server and allocates the service activation center 52 a source transmission address (it can be but is not limited to OOA). The terminal 53 can determine from the source transmission address that the short message is from the service activation center and conduct a corresponding process.

The Fifth Embodiment

In this embodiment, a method for activating a PS domain according to the first embodiment of the present invention will be described in detail, taking it as an example that a first terminal is required to initiate CSI service to a second terminal and instructs via a Setup message the second terminal to activate a PS domain.

Figure 6:
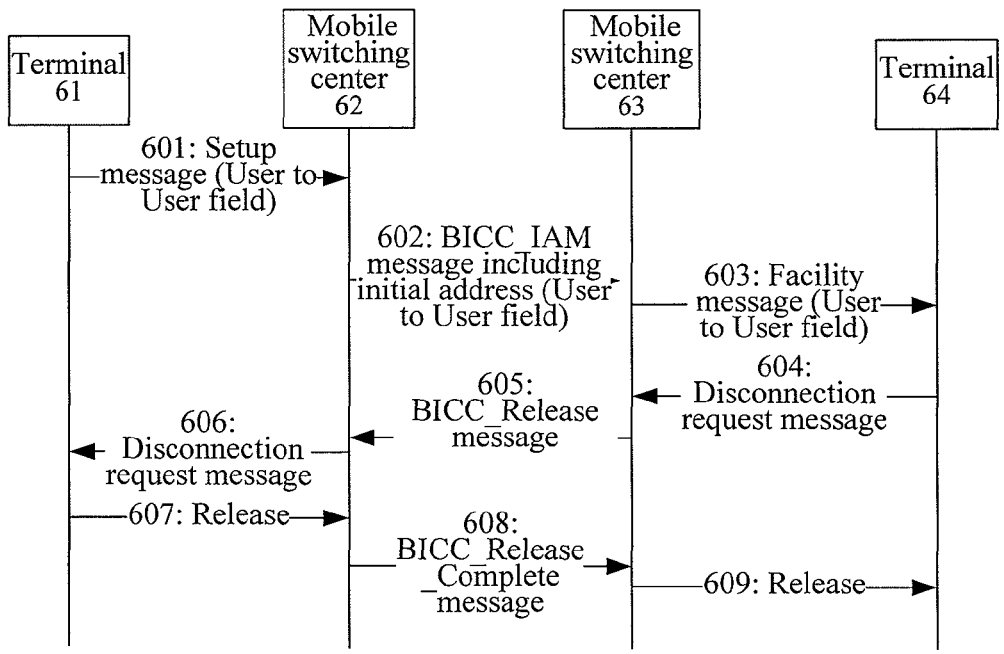
FIG. 6 is a schematic diagram illustrating a signaling flow in which a first terminal instructs via a Setup message a second terminal to activate a PS domain according to a fifth embodiment of the present invention.

It is assumed that a terminal 61 and a terminal 64 are in an ongoing CS session, and the terminal 61 initiates CSI service. The terminal 61 initiating the CSI service has activated a PS domain when the initiation is made. However, the terminal 64 does not reside in the PS domain, i.e., has not activated the PS domain. Therefore, the following flow is required to be performed (see FIG. 6).

601: The terminal 61 sends to the called terminal 64 a Setup message which firstly arrives at a mobile switching center 62. Protocol data is carried in a specific protocol format in a User to User field in the Setup message. The protocol data can indicate the type of the service, i.e., that the current message is used to instruct the called terminal to activate the PS domain.

602: After receiving the Setup message, the mobile switching center 62 initiates a call operation to a mobile switching center 63 to which the called terminal 64 belongs, sending a Bearer Independent Call Control protocol message including an Initial Address Message (a BICC_IAM message), in which the data of the User to User field is carried.

603: After receiving the BICC_IAM message, the mobile switching center 63 sends to the called terminal 64 a Facility message carrying the data of the User to User field.

604: After receiving the Facility message, the terminal 64 parses the encapsulation protocol in the data of the User to User field to obtain the corresponding service data contents, knows that the terminal 61 requests the present terminal to activate the PS domain, and thereby performs a corresponding operation of activating the PS domain. The operation of activating the PS domain can be performed directly. Alternatively, it is determined whether the present terminal supports activation of the PS domain, whether the present terminal agrees on activation of the PS domain, and whether the network where the present terminal is located supports activation of the PS domain. Then, in the case that all of the determinations are affirmative, the operation of activating the PS domain is performed.

After receiving the Facility message, the terminal 64 sends to the calling terminal 61 a disconnection request message to release a resource connection which is set up according to the current Setup message. The disconnection request message also carries a reason value indicating that the terminal 64 receives the User to User data successfully or why the terminal 64 fails to receive the User to User data.

605: After receiving the disconnection request message from the terminal 64, the mobile switching center 63 sends to the mobile switching center 62 a Release message of the Bearer Independent Call Control protocol (a BICC_Release message), which carries the reason value indicating that the terminal 64 receives the User to User data successfully or why the terminal 64 fails to receive the User to User data.

606: After receiving the BICC_Release message from the mobile switching center 63, the mobile switching center 62 initiates to the terminal 61 a disconnection request message carrying the reason value indicating that the terminal 64 receives the User to User data successfully or why the terminal 64 fails to receive the User to User data.

607: After receiving the disconnection request message, the terminal 61 performs a disconnection operation, analyzes the reason value carried in the disconnection request message, and thus knows whether the terminal B has received the encapsulation protocol data in the User to User field properly. In order to integrate the flow of disconnection, the terminal 61 can also return to the mobile switching center 62 a Release message, notifying about a result of completing disconnection.

608: After receiving the Release message, the mobile switching center 62 sends to the mobile switching center 63 a release complete message of the Bearer Independent Call Control protocol (a BICC_release complete message), which carries a reason value indicating the completion of disconnection.

609: After receiving the BICC_release complete message, the mobile switching center 63 sends to the terminal 64 a disconnection message carrying the reason value indicating the completion of disconnection. The terminal 64 knows from the reason value that the opposite terminal responds with the completion of disconnection.

As can be seen from above, with the method according to this embodiment of the present invention, the terminal 61 can send a Setup message instructing the terminal 64 to activate the PS domain, and the terminal 64 can trigger the operation of activating the PS domain according to the instruction, so that the terminal 64 can activate the PS domain passively.

The Sixth Embodiment

In this embodiment, a method for activating a PS domain according to the first embodiment of the present invention will be described in detail, taking it as an example that a first terminal is required to initiate CSI service to a second terminal and instructs via a Push message the second terminal to activate a PS domain.

Figure 7:
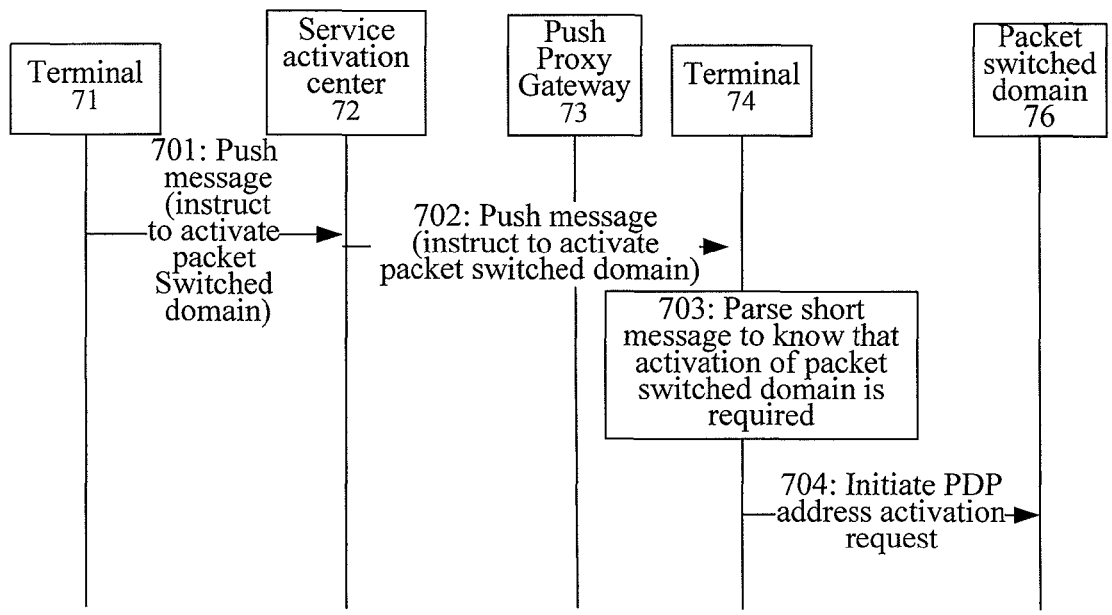
FIG. 7 is a schematic diagram illustrating a signaling flow in which a first terminal instructs via a Push message a second terminal to activate a PS domain according to a sixth embodiment of the present invention.

It is assumed that a terminal 71 and a terminal 74 are in an ongoing CS session and the terminal 71 initiates CSI service. The terminal 71 initiating the CSI service has activated a PS domain 76 when the initiation is made. However, the terminal 74 does not reside in the PS domain 76, i.e., has not activated the PS domain 76. Therefore, the following flow is required to be performed (see FIG. 7).

701: The terminal 71 generates a Push message carrying information for instructing the terminal 74 to activate the PS domain 76, so that the terminal 74 can know from the information that an operation of activating the PS domain 76 is currently required to be performed. And, an address of a service activation center 72 is added in the Push message. Then, the terminal 71 sends the generated Push message to the service activation center 72.

The service activation center 72 here can be a dedicated server or a general service server. When the service activation center 72 is a dedicated server, the terminal 71 shall send a special service request message. When the service activation center 72 is a general service server, it can regard the initiation of the service by the terminal 71 as a service request simultaneously, i.e., the terminal 71 can enter automatically the following flow without necessarily sending any special service request message.

In this embodiment, the Push message can use a value of an application identifier (app-id) to indicate that the current Push message is a message for instructing the opposite terminal to activate the PS domain 76.

702: The service activation center 72 acts as a PUSH Initiator (PI) and sends the Push message to the terminal 74 via a Push Proxy Gateway (PPG).

703: The terminal 74 parses the Push message and knows that the current Push message is a message for requesting the present terminal to activate the PS domain 76. The flow proceeds with 704.

704: The terminal 74 initiates to the packet switched domain 76 (e.g., a GGSN) a PDP activation request, activating the PDP and the packet switched domain 76.

Thereafter, the terminal 74 can continue to initiate registration with the CSCF and enters the flow of IMS service.

As can be seen from above, with the method according to the embodiment of the present invention, the terminal 71 can send a Push message instructing the terminal 74 to activate the PS domain 76, and the terminal 74 can trigger the operation of activating the PS domain 76 according to the instruction, so that the terminal 74 can activate the PS domain 76 passively.

The Seventh Embodiment

In this embodiment, a method for activating a PS domain passively or inversely will be described in detail, taking it as an example that a first terminal and a second terminal are currently in the same PS domain (referred to as a first PS domain hereinafter) and that the first terminal instructs the second terminal to activate another PS domain (referred to as a second PS domain hereinafter).

It is assumed that a network mode of a certain terminal supports at least two approaches for access to a PS domain, for example, supports capabilities of Wideband Code Division Multiple Access (WCDMA) and Wireless Fidelity (WIFI). The terminal currently resides in an IMS network via the WIFI. Then, the terminal receives a session Invite (an Invite request message) requesting for a VoIP service. However, since voice in the WIFI network is transmitted directly over the Internet, there is no sufficient guarantee of QoS. At this time, the service shall be provided via the WCDMA.

Figure 8:
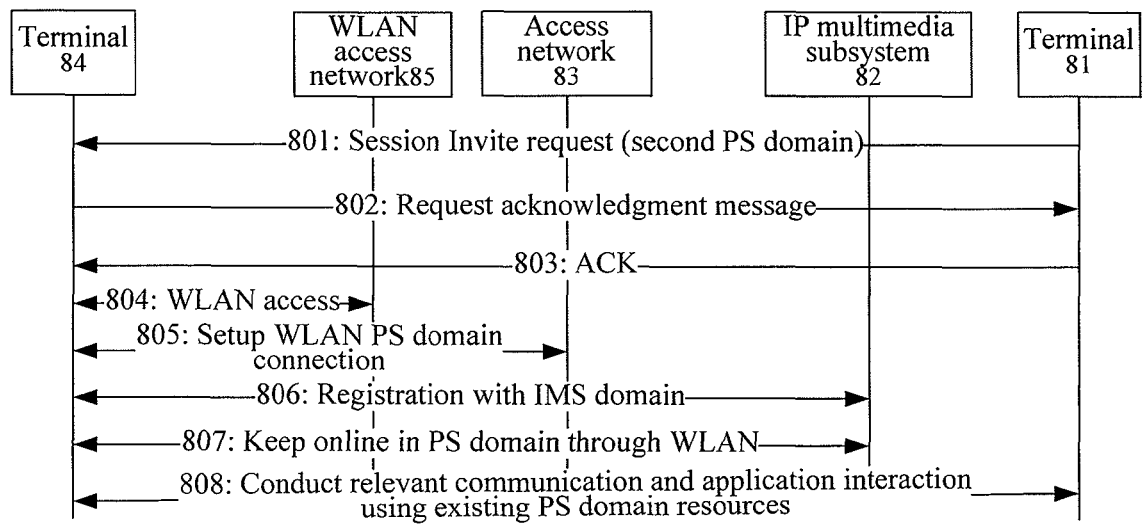
FIG. 8 is a schematic diagram illustrating a method in which a first terminal instructs a second terminal to activate a second PS domain according to a seventh embodiment of the present invention.

Thus, according to the received Invite request message, the terminal can activate a PS domain of WCDMA passively and registers with the IMS over the WCDMA, thereby accomplishing the subsequent call function. A specific flow is illustrated in FIG. 8. As illustrated in FIG. 8, a flow in which a terminal 81 and a terminal 84 are currently in the same PS domain and the terminal 81 instructs the terminal 84 to activate the second PS domain is as follows.

801: The terminal 81 initiates a session Invite request to the terminal 84 in a way of signaling in the IMS/SIP via the current PS domain. Information on the PS domain to be activated (the second PS domain) is carried in the session Invite request, requesting the terminal 84 to activate the second PS domain.

In this embodiment, the session Invite request can be but is not limited to a session Invite request message (an Invite request message). When it is an Invite request message, the message can carry information on a connection parameter in the PS domain (a requirement on the connection parameter). For example, the Invite request message in the following format can be used.

```
INVITE sip:bob@biloxi.com SIP/2.0
Via: SIP/2.0/UDP pc33.atlanta.com;branch=z9hG4bK776asdhds
Max-Forwards: 70
To: Bob <sip:bob@biloxi.com>
From: Alice <sip:alice@atlanta.com>;tag=1928301774
Require-Access: WLAN        //Request for access to the PS domain
in the WLAN network
Call-ID: a84b4c76e66710@pc33.atlanta.com
CSeq: 314159 INVITE
Contact: <sip:alice@pc33.atlanta.com>
Content-Type: application/sdp
Content-Length: 147
v=0
o=UserA 2890844526 2890844526 IN IP4 atlanta.com
s=Session SDP
c=IN IP4 100.101.102.103
t=0 0
m=audio 49172 RTP/AVP 0
a=rtpmap:0 PCMU/8000
```

As can be seen from the above Invite request, such a requirement for the access approach is presented in "Require-Access: WLAN" that the receiver of the request shall initiate a process of activating a new WLAN PS domain.

802: After receiving the session Invite request, the terminal 84 returns to the terminal 81 a request acknowledgement message (it can be but is not limited to 200 OK), replying to and acknowledging the Invite request message.

Taking it as an example that the request acknowledgement message is 200 OK, the message of 200 OK is in the following format.

```
SIP/2.0 200 OK
Via: SIP/2.0/UDP
server10.biloxi.com;branch=z9hG4bKnashds8;received=192.0.2.3
Via: SIP/2.0/UDP
bigbox3.site3.atlanta.com;branch=z9hG4bK77ef4c2312983.1;received=192.0.2.2
Via: SIP/2.0/UDP
pc33.atlanta.com;branch=z9hG4bK776asdhds ;received=192.0.2.1
To: Bob <sip:bob@biloxi.com>;tag=a6c85cf
From: Alice <sip:alice@atlanta.com>;tag=1928301774
Support-Access: WLAN
Call-ID: a84b4c76e66710@pc33.atlanta.com
CSeq: 314159 INVITE
Contact: <sip:bob@192.0.2.4>
Content-Type: application/sdp
Content-Length: 147
v=0
o=UserB 2890844527 2890844527 IN IP4 biloxi.com
s=Session SDP
c=IN IP4 110.111.112.113
t=0 0
m=audio 3456 RTP/AVP 0
a=rtpmap:0 PCMU/8000
```

As can be seen from the request acknowledgement mess (200 OK), the terminal 84 receiving the session Invite supports the WLAN access approach and indicates the support to the WLAN in the support access parameter (Support-Access: WLAN).

803: After receiving the request acknowledgment message from the terminal 84, the terminal 81 returns an acknowledgement (it can be but is not limited to ACK) to the terminal 84.

When the acknowledgement is ACK, ACK can be in the following format.

```
ACK sip:bob@192.0.2.4 SIP/2.0
Via:SIP/2.0/UDP pc33.atlanta.com;branch=z9hG4bknashds0
Max-Forwards:70
To:Bob <sip:bob@biloxi.com>;tag=a6c85cf
From:Alice <sip:alice@atlanta.com>;tag=1928301774
Call-ID:a84b4c76e66710
CSeq:314159 ACK
content-Length:0
```

804: After receiving the session Invite requesting for access to the second PS domain (the PS domain of the WLAN), the terminal 84 interacts with a WLAN access network (WLAN-AN) 85 and performs an operation of a WLAN access to the AN.

805: The terminal 84 accomplishes the access to the WLAN AN 85, and then accomplishes interaction with a core network. Then, the terminal 84 has access to the required second PS domain (the PS domain of the WLAN) via a WLAN access network 83, setting up a connection with the PS domain of the WLAN. Thus, the terminal 84 logs into the PS domain of the WLAN and is in a WLAN PS domain online status.

806: After the access to the PS domain of the WLAN, according to a current service demand, if the currently required service is IMS service, the terminal 84 can further perform interacting with the IMS 82 via the PS domain which is set up with the WLAN and registering with the IMS domain.

807: After completing registration with the IMS domain, the terminal 84 logs into the IMS domain and keeps online in the PS domain via the WLAN.

808: After completing the above operations, the terminal 84 and the terminal 81 can conduct relevant communication and application interaction by means of resources of the existing PS domain.

With the flow above, a process can be implemented in which an application layer message of a connection in a PS domain connection is used to setup/activate a connection in another PS domain. During this process, an INVITE request in the IMS/SIP is used to complete a process of setting up an access approach. Actually, in a specific implementation, other approaches, such as the protocol of RTSP and RSVP, can be used with reference to the descriptions above.

In this solution, 802 and 803 occur prior to 804, i.e., the actual activation process is performed only after terminal 84 accomplishes interaction with the application layer. However, in view of a specific implementation, the steps of activating the second PS domain at 804 and 805 can also occur prior to 802 and 803. In other words, once a request is presented by the opposite terminal, a corresponding operation of activating the PS domain is performed firstly, and then 802 and 803 are performed if the present terminal supports the request. A request acknowledgement message, such as 200 OK, is used to acknowledge the modified result. Further, the steps of activation and acknowledgment can be performed concurrently, and the specific order can be determined particularly dependent upon the specific implementation.

As can be seen from above, with the technical solution according to this embodiment of the present invention, the terminal 84 can activate the second PS domain passively, so that it is possible for the terminal 81 and the terminal 84 to deploy a PS domain based service (e.g., IMS service) in the newly activated second PS domain.

The Eighth Embodiment

In this embodiment, a method for modifying a parameter of a PS domain passively or inversely will be described in detail, taking it as an example that a first terminal and a second terminal are currently in the same PS domain and that due to service change, the first terminal is required to instruct the second terminal to modify a parameter or configuration of a PS domain where the second terminal is located.

Figure 9:
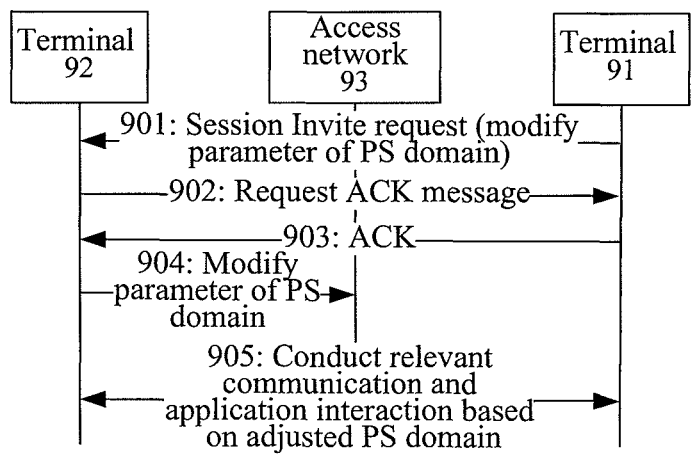
FIG. 9 is a schematic diagram illustrating a method in which a first terminal instructs a second terminal to modify a parameter of a current PS domain according to an eighth embodiment of the present invention.

It is assumed that both terminals of current service conduct the PS domain based service in the same PS domain (the current service can be assumed to be IMS service for convenience). A current network Quality of Service (QoS) parameter is Background (indicating that the sensitivity to service delay is minimum currently). In the current scenario, a signaling interaction process can be accomplished in an IMS/SIP (Session Initiation Protocol) mechanism, according to a demand on the service between the two terminals. In the case that the current service demand changes, for example, in the case when service such as Voice over IP (VoIP) or Voice & Vide over IP (V2oIP) is currently required, the QoS of Background may not be suitable. Thus, a QoS of PDP shall be applied for or a second PDP shall be set up. At this time, the called terminal or either terminal of the call participators can initiate a secondary packet data protocol (PDP) process in a way of signaling in the IMS/SIP, such as in a way of session Invite, but not being limited to the way above. Thus, a parameter of the PS domain can be adjusted for better provision of the service. A specific flow is illustrated in FIG. 9. As illustrated in FIG. 9, the flow is as follows.

901: A terminal 91 initiates to a terminal 92 a session Invite request message, which requests the terminal 92 for adjusting a connection parameter of a PS domain, in a way of signaling in the IMS/SIP via the current PS domain.

In this embodiment, the session Invite request can be but is not limited to a session Invite request message (an Invite request message). When it is an Invite request message, the message can carry information on the connection parameter of the PS domain (a requirement on the connection parameter). For example, the Invite request message in the following format can be used.

```
INVITE sip:bob@biloxi.com SIP/2.0
Via: SIP/2.0/UDP pc33.atlanta.com;branch=z9hG4bK776asdhds
Max-Forwards: 70
To: Bob <sip:bob@biloxi.com>
From: Alice <sip:alice@atlanta.com>;tag=1928301774
Call-ID: a84b4c76e66710@pc33.atlanta.com
Require-Qos: Streaming          //A demand on a QoS of Streaming
                                  is presented
CSeq: 314159 INVITE
Contact: <sip:alice@pc33.atlanta.com>
Content-Type: application/sdp
Content-Length: 147
v=0
o=UserA 2890844526 2890844526 IN IP4 atlanta.com
s=Session SDP
c=IN IP4 100.101.102.103
t=0 0
m=audio 49172 RTP/AVP 0
a=rtpmap:0 PCMU/8000
```

As can be seen from the Invite request message above, in the parameter of Require-QoS, a demand on a QoS of Streaming is presented and it is also required that the terminal 92 receiving the Invite request message shall make a modification.

902: After receiving the session Invite request message, the terminal 92 returns to the terminal 91 a request acknowledgement message (it can be but is not limited to 200 OK), replying to and acknowledging the Invite request message.

Taking it as an example that the request response is 200 OK, the response of 200 OK can be in the following format.

```
SIP/2.0 200 OK
Via:                     SIP/2.0/UDP
server10.biloxi.com;branch=z9hG4bKnashds8;received=192.0.2.3
Via: SIP/2.0/UDP
bigbox3.site3.atlanta.com;branch=z9hG4bK77ef4c2312983.1;received=192.0.2.2
Via:                     SIP/2.0/UDP
pc33.atlanta.com;branch=z9hG4bK776asdhds ;received=192.0.2.1
To: Bob <sip:bob@biloxi.com>;tag=a6c85cf
From: Alice <sip:alice@atlanta.com>;tag=1928301774
```

```
Call-ID: a84b4c76e66710@pc33.atlanta.com
Support-QoS: Streaming //Indicating that the terminal 92 will modify the QoS parameter to
  be Streaming
CSeq: 314159 INVITE
Contact: <sip:bob@192.0.2.4>
Content-Type: application/sdp
Content-Length: 147
v=0
o=UserB 2890844527 2890844527 IN IP4 biloxi.com
s=Session SDP
c=IN IP4 110.111.112.113
t=0 0
m=audio 3456 RTP/AVP 0
a=rtpmap:0 PCMU/8000
```

In the request acknowledgement message (200 OK) above, the parameter of Support-QoS: Streaming indicates that the terminal 92 modifies the QoS parameter to be Streaming from original Background according to the session Invite request.

903: After receiving the request acknowledgement message, the terminal 91 returns to the terminal 92 another acknowledgement (it can be but is not limited to ACK).

When the acknowledgement is ACK, ACK can be in the following format.

```
ACK sip:bob@192.0.2.4 SIP/2.0
Via:SIP/2.0/UDP pc33.atlanta.com;branch=z9hG4bknashds0
Max-Forwards:70
To:Bob <sip:bob@biloxi.com>;tag=a6c85cf
From:Alice <sip:alice@atlanta.com>;tag=1928301774
Call-ID:a84b4c76e66710
CSeq:314159 ACK
content-Length:0
```

904: After receiving the session Invite request message for requesting for modifying the parameter of the PS domain, the terminal 92 interacts with an access network 93 to perform an operation of modifying the parameter of the PS domain according to the request.

905: After completing the operation of modifying the parameter of the PS domain, the terminal 92 and the terminal 91 can conduct relevant communication and application interaction by means of resources in the existing PS domain.

In general, a PS connection parameter of the application layer can be modified with the flow above. The process of flows can be implemented differently. For example, the SIP INVITE method is used in this embodiment. However, other SIP methods such as NOTIFY can also be used. As such, based on the solution above, other IP based application layer protocols, such as the Real Time Streaming Protocol (RTSP) and the Resource Reservation Protocol (RSVP), can also be used.

Further, 902 and 903 occur prior to 904 in this embodiment, i.e., an actual modification process is conducted only after interaction with the application layer is accomplished. However, in view of a specific implementation, the modification step at 904 can also occur prior to 902 and 903. In other words, once a request is presented by the opposite terminal, a modification is made firstly, and then 902 and 903 are performed if the present terminal supports the request. A message such as 200 OK is used to acknowledge the modified result. Further, the steps of modification and acknowledgment can be performed concurrently.

Figure 10:
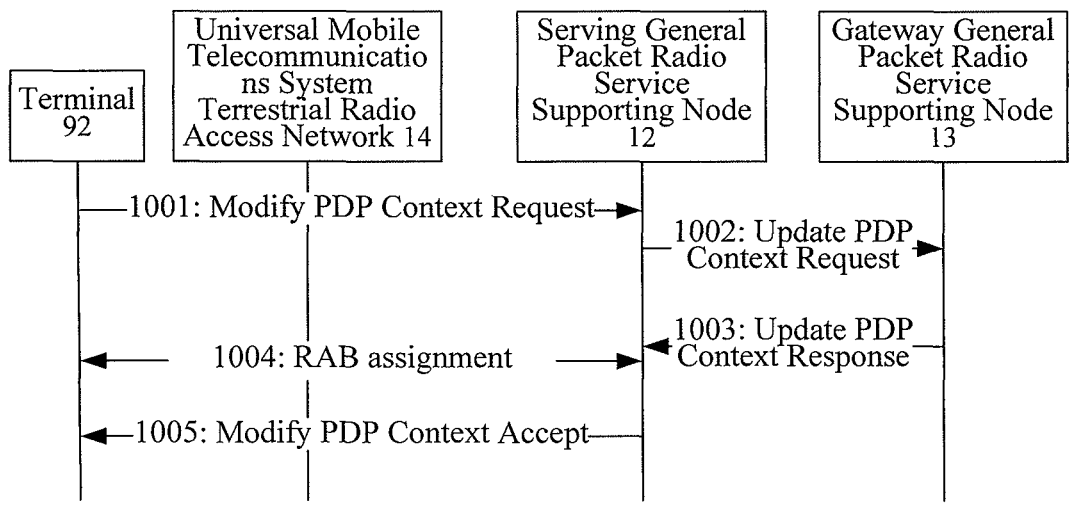
FIG. 10 is a schematic diagram illustrating how a terminal 92 modifies a parameter of a PS domain through a normal flow according to the eighth embodiment of the present invention.

Descriptions are given below as for how the terminal 92 modifies the parameter of the PS domain in a normal flow at 904. As illustrated in FIG. 10, the flow is as follows.

1001: The terminal 92 sends to a Serving General Packet Radio Service Supporting Node (SGSN) 12 a Modify PDP Context Request message, which carries a PS domain parameter to be modified (in this embodiment, the parameter is to be modified to be a QoS of Streaming), requesting for modifying the PDP context.

1002: The SGSN 12 conducts QoS negotiation with a Gateway General Packet Radio Service Supporting Node (SGSN) 13 by sending to the GGSN 13 a packet data protocol context update request carrying the PS domain parameter to be modified (QoS Negotiated) and possibly parameters of a Tunnel Endpoint Identifier (TEID), a Network Service Access Point Identifier (NSAPI), a Trace Reference, a Trace Type, a Trigger ID, an Operation & Maintenance Center Identity (OMC Identity), etc., (e.g., Update PDP Context Request (TEID, NSAPI, QoS Negotiated, Trace Reference, Trace Type, Trigger ID, OMC Identity)).

1003: The GGSN 13 conducts QoS negotiation and returns to the SGSN 12 a packet data protocol context update response carrying a negotiation result and a reason (Update PDP Context Response (TEID, QoS Negotiated, Cause)).

1004: After receiving the response, the SGSN 12 assigns the terminal 92 a Radio Access Bearer (RAB) via a Universal Mobile Telecommunications System Terrestrial Radio Access Network (UTRAN) 14, modifying the RAB.

1005: After RAB modification is completed, the SGSN 13 sends to the terminal 92 a Modify PDP Context Accept notification, notifying the terminal 92 about the completion of the RAB modification.

As can be seen from above, with the technical solution according to this embodiment of the present invention, the terminal 92 can modify passively a parameter of the PS domain where the terminal 92 is currently located, so that it is possible for the terminal 92 and the terminal 91 to deploy PS domain based service (e.g., IMS service) in the PS domain with the modified parameter.

It shall be noted that in the respective embodiments above, when the first terminal instructs the second terminal which is not in any PS domain (possibly in a CS domain) to activate a PS domain (as in the second, third, fourth, fifth and sixth embodiments), when the first terminal instructs the second terminal which is currently in the same PS domain to activate the second PS domain (as in the seventh embodiment), or when the first terminal instructs the second terminal which is currently in the same PS domain to modify a parameter of the PS domain where they are currently located (as in the eighth embodiment), the first terminal can also carry corresponding authentication information in the instruction, so that the second terminal can determine whether the terminal sending the received instruction is a legal terminal in accordance with the authentication information in the instruction according to a pre-agreed authentication method. The second terminal can conduct a corresponding PS domain process only if the authentication determination above is passed. A specific principle of the authentication mechanism here is available from the existing systems. An example is given as follows.

The first terminal can carry a user identifier of the present terminal in the instruction. After receiving the instruction, the second terminal can determine whether the terminal initiating the instruction is a legal user for the present terminal in accordance with the user identifier (for example, the second terminal can create a group of legal users and determine whether the user is a legal user in accordance with whether the initiating terminal is in the group of legal users). If the terminal initiating the instruction is a legal user, the second terminal can conduct a corresponding PS domain process according to the instruction. Otherwise, no process will be conducted.

Introduction of the authentication mechanism above can prevent effectively a user of the second terminal from being disturbed maliciously or unnecessarily by an illegal user, thereby guaranteeing effectively benefits of the terminal user and improving greatly an experience of the user.

Those skilled in the art can appreciate that all or part of the steps in the methods according to the embodiments above can be implemented by a program instructing relevant hardware, which can be stored in a computer readable storage medium. When being executed, the program can include the following steps: a first terminal instructs a second terminal to change the status of a packet switched domain, where the changing of the status of the packet switched domain includes activating the packet switched domain or modifying a parameter of the packet switched domain where the second terminal is currently located; and the second terminal changes the status of the packet switched domain after receiving the instruction. The storage medium as referred to here includes, for example, ROM/RAM, a magnetic disk, an optical disk, etc.

The Ninth Embodiment

Figure 11:
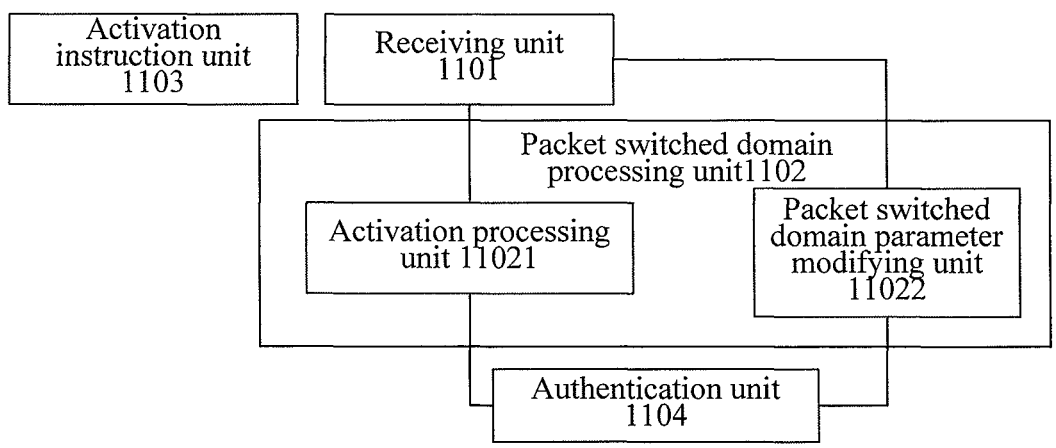
FIG. 11 is a schematic diagram illustrating the structure of a terminal according to a ninth embodiment of the present invention.

FIG. 11 is a schematic diagram illustrating the structure of a terminal according to an embodiment of the present invention. As illustrated in FIG. 11, the terminal supports PS domain based service and includes a receiving unit 1101 and a packet switched domain processing unit 1102.

The receiving unit 1101 is adapted to receive a message from another terminal (e.g., a first terminal). The message includes an instruction for changing a status of a PS domain. Here, the changing of the status of the PS domain includes activating the PS domain or modifying a parameter of the PS domain where the terminal is currently located.

The packet switched domain processing unit 1102 is adapted to change the status of the packet switched domain according to the instruction for changing the status of the PS domain received by the receiving unit 1101.

The packet switched domain processing unit 1102 may further include an activation processing unit 11021 and/or a packet switched domain parameter modifying unit 11022.

The activation processing unit 11021 is adapted to activate the corresponding PS domain according to the instruction for activating the PS domain received by the receiving unit 1101. As for a specific implementation principle, reference can be made to the descriptions in the first, second, third, fourth, fifth, sixth and eighth embodiments.

The packet switched domain parameter modifying unit 11022 is adapted to modify the parameter of the PS domain where the terminal is currently located according to the instruction for modifying the parameter of the PS domain where the terminal is currently located received by the receiving unit 1101. As for a specific implementation principle, reference can be made to the descriptions in the seventh embodiment.

As can be seen from above, the packet switched domain processing unit 1102 of the terminal according to the embodiment of the present invention can perform a corresponding operation on the PS domain after the receiving unit 1101 receives the instruction for changing the status of the PS domain. Obviously, the terminal supports passive changing of the status of the PS domain to deploy PS domain based service such as IMS service in the PS domain with the changed status.

The terminal according to an embodiment of the present invention may further include an authentication unit 1104.

The authentication unit 1104 is adapted to determine whether the terminal sending the instruction is a legal terminal in accordance with authentication information carried in the instruction for changing the status of the packet switched domain received by the receiving unit 1101. If it is a legal terminal, the packet switched domain processing unit 1102 is triggered to perform an operation of changing the status of the packet switched domain. Otherwise, the packet switched domain processing unit 1102 is not triggered to change the status of the packet switched domain. As for a specific implementation principle, reference can be made to the descriptions in the eighth embodiment.

When the authentication unit 1104 determines whether the first terminal is a legal terminal, the detail of the triggering of the packet switched domain processing unit 1102 to perform an operation of changing the status of the packet switched domain is as follows. If the current instruction requests the second terminal to activate a PS domain (regardless of whether the second terminal is currently in another PS domain), the activation processing unit 11021 is triggered to initiate a PDP activation request to the PS domain as requested, requesting for an operation of activating the PS domain. If the current instruction requests the second terminal to change the status of the PS domain where the terminal is currently located, the packet switched domain parameter modifying unit 11022 is triggered to perform an operation of modifying the parameter of the PS domain.

When passively performing an operation on the PS domain according to the instruction, the terminal including the authentication unit 1104 can also conduct a corresponding authentication process to determine whether a user of the first terminal is legal. If it is illegal, no process will be conducted. Obviously, the terminal including the authentication unit 1104 can prevent effectively an illegal user from disturbing, thereby guaranteeing effectively benefits of the terminal user and improving greatly an experience of the user.

The terminal according to the embodiment of the present invention may further include an activation instruction unit 1103.

The activation instruction unit 1103 is adapted to instruct another terminal (e.g., the first terminal) to change the status of the PS domain.

In addition to the function of changing the status of a PS domain, the terminal further including the activation instruction unit 1103 can also act as an instruction initiator when it is required to conduct PS domain based service with another terminal. The activation instruction unit 1103 instructs the other terminal to change the status of the PS domain so as to conduct the PS domain based service with the present terminal.

It shall be noted that the terminal according to this embodiment of the present invention can be implemented in a form of hardware or a software function module. The device according to the embodiment of the present invention can be sold or used as a separate product or stored in a computer readable storage medium.

The Tenth Embodiment

Figure 12:
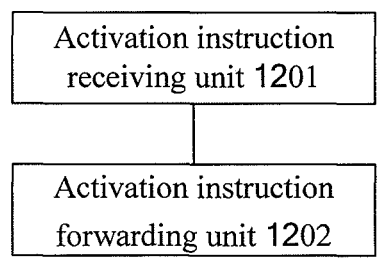
FIG. 12 is a schematic diagram illustrating the structure of a service activation center according to a tenth embodiment of the present invention.

FIG. 12 is a schematic diagram illustrating the structure of a service activation center according to an embodiment of the present invention. As illustrated in FIG. 12, the service activation center includes an activation instruction receiving unit 1201 and an activation instruction forwarding unit 1202.

The activation instruction receiving unit 1201 is adapted to receive an instruction for activating a PS domain from a first terminal.

The activation instruction forwarding unit 1202 is adapted to forward the instruction for activating the PS domain received by the activation instruction receiving unit 1201 to a second terminal so that the second terminal can activate the PS domain according to the instruction.

In a specific communication network, the service activation center according to the embodiment of the present invention can be connected with a short message center, i.e., the short message center can regard the service activation center as a value-added service server and assign the service activation center with a source transmission address (it can be but not limited to OOA). The terminal can determine that the short message is from the service activation center in accordance with the transmission address of the first terminal and conduct a corresponding process.

As can be seen from above, a service activation switching center according to the embodiment of the present invention can instruct the terminal to activate the PS domain by forwarding the instruction for activating the PS domain, so that the terminal can activate the PS domain passively according to the instruction to deploy PS domain based service.

It shall be noted that the service activation center according to the embodiment of the present invention can be implemented in a form of hardware or a software function module. The device according to the embodiment of the present invention can be sold or used as a separate product or stored in a computer readable storage medium.

The Eleventh Embodiment

Figure 13:
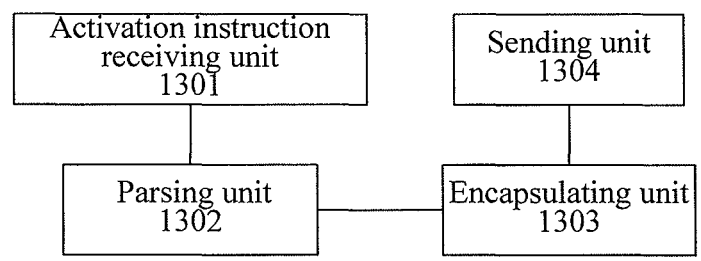
FIG. 13 is a schematic diagram illustrating the structure of a mobile switching center according to an eleventh embodiment of the present invention.

FIG. 13 is a schematic diagram illustrating the structure of a mobile switching center according to an embodiment of the present invention. As illustrated in FIG. 13, the mobile switching center includes an activation instruction receiving unit 1301, a parsing unit 1302, an encapsulating unit 1303 and a sending unit 1304.

The activation instruction receiving unit 1301 is adapted to receive a DTMF message from a first terminal.

The parsing unit 1302 is adapted to parse the DTMF message received by the activation instruction receiving unit 1301.

The encapsulating unit 1303 is adapted to encapsulate information in the DTMF message as a signaling message such as a Facility message when the parsing unit 1302 knows from parsing that the DTMF message is used to instruct a second terminal to activate a PS domain.

The sending unit 1304 is adapted to send the signaling message resulting from the encapsulation at the encapsulating unit 1303 to the second terminal.

As can be seen from above, the mobile switching center according to this embodiment of the present invention can re-encapsulate the received DTMF message for instructing activation of the PS domain into a signaling message. In this way, the terminal can be instructed to activate the PS domain, so that the terminal can activate the PS domain passively according to the instruction to deploy PS domain based services. And, a problem can be avoided that the reception of the instruction by the terminal may bring disturbance (e.g., voice mixing) to current service (particularly a CS session)

It shall be noted that the mobile switching center according to this embodiment of the present invention can be implemented in a form of hardware or a software function module. The device according to the embodiment of the present invention can be sold or used as a separate product or stored in a computer readable storage medium.

The foregoing descriptions are merely illustrative of a method, terminal and network devices for changing the status of a packet switched domain according to embodiments of the present invention, and the principle and implementations of the embodiments have been set forth in this context by way of specific examples. The embodiments above are described only to facilitate understanding of the method and the principle according to embodiments of the present invention. Variations and alternatives which can be made by those ordinarily skilled in the art within the scope of the solutions according to the present invention shall fall within the protection scope of the present invention as defined in the appended claims.

What is claimed is:

1. A method for changing the status of a packet switched domain, comprising:
   receiving, by a second terminal that has not activated the packet switched domain, an instruction for activating the packet switched domain, wherein the instruction is one of the following:
   a dual tone multi-frequency message that is generated by a first terminal and transmitted by a first switching center when the first and second terminals belong to the first switching center, wherein the dual tone multi-frequency message is transmitted by the first switching center and a second switching center when the first terminal belongs to the first switching center and the second terminal belongs to the second switching center, and
   a signaling message generated based on the dual tone multi-frequency message that is generated and sent by the first terminal,
   wherein the second terminal and the first terminal are in an ongoing circuit switched session in which the dual tone multi-frequency message is transmitted; and
   activating, by the second terminal, the packet switched domain according to the instruction.

2. The method for changing the status of the packet switched domain according to claim 1, wherein the instruction carries authentication information and the method further comprises:
   obtaining the authentication information, and activating the packet switched domain if it is determined that the first terminal is a legal terminal in accordance with the authentication information.

3. The method for changing the status of the packet switched domain according to claim 1, after receiving the instruction and before activating the packet switched domain, the method further comprises:
   activating the packet switched domain if it is determined that the second terminal supports the packet switched domain and the network where the second terminal is located supports activation of the packet switched domain; or activating the packet switched domain if it is determined that the second terminal supports the packet switched domain and agrees on activation of the packet switched domain, and that the network where the second terminal is located supports the activation of the packet switched domain.

4. The method for changing the status of the packet switched domain according to claim 3, further comprising:
returning, by the second terminal, to the first terminal a response message comprising information on whether the second terminal supports the packet switched domain and whether the network where the second terminal is located supports the activation of the packet switched domain; or information on whether the second terminal supports the packet switched domain and agrees on the activation of the packet switched domain and whether the network where the second terminal is located supports the activation of the packet switched domain.

5. The method for changing the status of the packet switched domain according to claim 1, wherein
the dual tone multi-frequency message carries a service identifier for requesting the second terminal to activate the packet switched domain.

6. A terminal, comprising:
a receiving unit adapted to receive an instruction for activating a packet switched domain, wherein the terminal has not activated the packet switched domain and the instruction is one of the following:
a dual tone multi-frequency message that is generated by a first terminal and transmitted by one or two mobile switching centers, and
a signaling message generated based on the dual tone multi-frequency message that is generated and sent by the first terminal,
wherein the second terminal and the first terminal are in an ongoing circuit switched session in which the dual tone multi-frequency message is transmitted; and
an activation processing unit adapted to activate the packet switched domain according to the instruction for activating the packet switched domain received by the receiving unit.

7. The terminal according to claim 6, further comprising:
an authentication unit adapted to determine whether the first terminal is a legal terminal in accordance with authentication information carried in the instruction for activating the packet switched domain received by the receiving unit, and to trigger the activation processing unit to activating the packet switched domain if the first terminal is determined to be the legal terminal.

8. The terminal according to claim 6, further comprising:
an activation instruction unit adapted to send to the first terminal an instruction for at least one of the following (a) activating the packet switched domain; and (b) modifying the parameter of the packet switched domain where the first terminal is currently located.

9. A method for changing the status of a packet switched domain, comprising:
receiving, by a second terminal which has not activated the packet switched domain, a Facility message carrying a service identifier for requesting the second terminal to activate the packet switched domain;
activating, by the second terminal, the packet switched domain according to the Facility message;
wherein a first terminal and the second terminal are in an ongoing circuit switched session, and the Facility message is sent by a second mobile switching center after the second mobile switching center receives information carrying the service identifier from a first mobile switching center, and the information carrying the service identifier is sent by the first mobile switching center after the first mobile switching center receives a call setup message carrying the service identifier from the first terminal.

10. The method according to claim 9, wherein the service identifier is carried by a User in a User field of the call setup message.

11. The method according to claim 9, wherein after receiving the call setup message, the method further comprises:
sending, by the second terminal, to the first terminal a disconnection instruction to instruct the first terminal to perform an operation of disconnecting a connection with the second terminal.

12. The method according to claim 11, wherein the disconnection instruction further carries information indicating whether the second terminal receives the call Setup message.

* * * * *